United States Patent [19]

Terraillon

[11] 4,194,354

[45] Mar. 25, 1980

[54] TIMER

[76] Inventor: Paul Terraillon, Le Mont Gosse, 74 560 Monnetier-Mornex, France

[21] Appl. No.: 903,495

[22] Filed: May 8, 1978

[30] Foreign Application Priority Data

Feb. 6, 1978 [CH] Switzerland ........................ 1283/78

[51] Int. Cl.[2] ..................... G04B 37/12; A47G 29/00; F16G 11/00

[52] U.S. Cl. .................................... 368/276; 248/359; 24/129 C; 368/301

[58] Field of Search ....................... 58/56, 22.9, 21.13, 58/39.5, 74, 95 , 88 R; 224/4 A, 4 B, 4 C, 4 E, 4 G; 248/114, 359, 317; 24/115 R, 115 K, 129 C, 131 R

[56] References Cited

U.S. PATENT DOCUMENTS 1,004,968 10/1911 Baugh ............................... 224/26 R

*Primary Examiner*—J. V. Truhe
*Assistant Examiner*—John B. Conklin
*Attorney, Agent, or Firm*—Pennie & Edmonds

[57] ABSTRACT

Disclosed is a timer provided with a cord so that the same may be worn as a pendant. The timer comprises two mating half housings, one of which carries a cap having a notch and secured to the adjacent housing by a screw or other suitable means. Intermediate the cap and the adjacent housing half is a stirrup shaped along its length to conform generally to the contour of the housing and extending through the notch and into the cap where it has an eyelet on one end through which the screw holding the cap passes to secure the stirrup in place. The other outer end of the stirrup has a loop. The ends of the cord pass frictionally through the loop and along the length of the stirrup, through the notch in the cap and are positioned within the cap and gripped securely between the cap and the adjacent housing half.

1 Claim, 4 Drawing Figures

FIG. 1
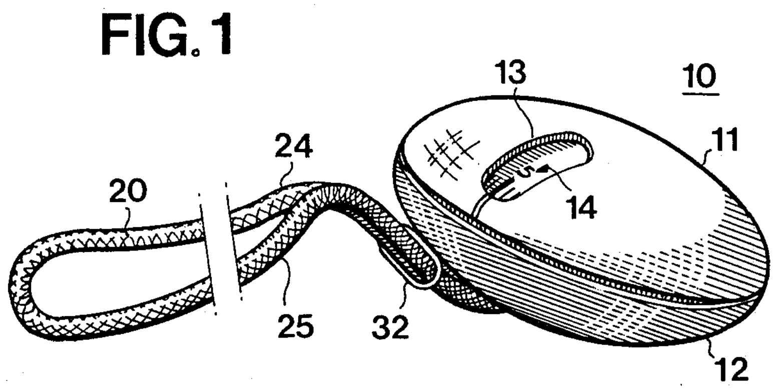
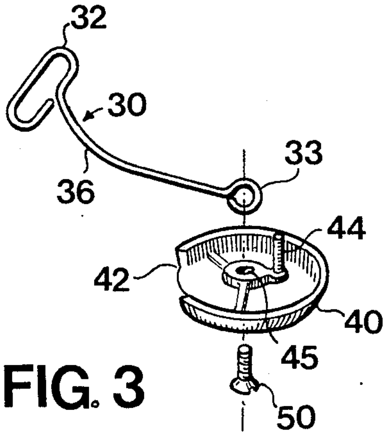
FIG. 3
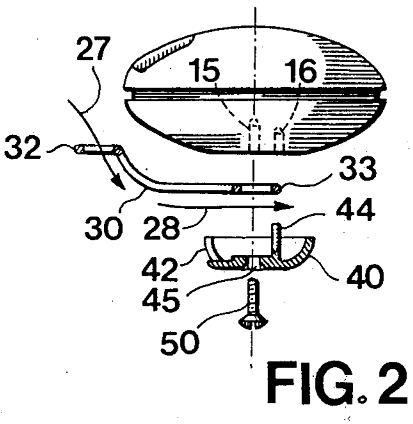
FIG. 2
FIG. 4
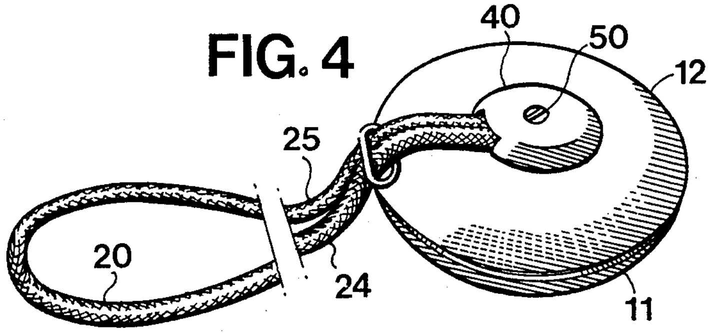

TIMER

BACKGROUND OF THE INVENTION

1. The Prior Art

Ringing kitchen timers are known which may be attached to a stove or grill as a part thereof or may be separate units mounted on a small base of their own. In either event they are designed to monitor cooking time. Still others are portable and may have, for example, a rounded or ovoid shape. Such a shape makes the object easier to pick up and carry when it is desired to carry the same away from the kitchen during the cooking period being monitored as when a housewife wishes to perform other tasks or to relax and leave her kitchen while keeping the timer with her.

Carrying the timer with one upon leaving the kitchen is easily remembered but if one then undertakes another task such as answering the telephone or the like the timer may be placed on a table or other object and forgotten. While a man has the expedient of putting the object in his pocket, the pockets in most women's garments are only decorative at best and as such she is inclined to mislay the timer and be out of hearing when it rings.

OBJECTS OF THE INVENTION

One of the objects of the invention is to provide a simple and convenient means for a housewife to carry the timer with her while eliminating the inclination to place the timer on any convenient surface such as a table should she undertake another task. One possibility considered was to provide the housing with a loop on its periphery where a cord could be inserted, however, with the plastic materials used in such timers the loop is relatively vulnerable and might break. Moreover, such a projection is difficult to design and still be esthetic. Still further, the loop must be provided at the periphery and not at the center since otherwise it could not be worn about the neck and hang properly as a pendant.

BRIEF DESCRIPTION OF THE INVENTION

The present invention is directed to solving these problems by attaching at the center of one of the outer surfaces of the housing a stirrup comprising an arm shaped generally to conform to the housing and terminating in a loop adjacent the periphery of the housing. The other end of the arm has an eyelet through which the stirrup is secured by a screw and a cap to the housing proper. The ends of the cord are passed through the loop where they are engaged frictionally, pass through a notch in the cap and into the space between the cap and the housing where they are clamped or wedged between the cap and the housing.

BRIEF DESCRIPTION OF THE DRAWINGS

The invention will be understood by those skilled in the art by reference to the following specification and drawings in which:

FIG. 1 shows the timer in a perspective view,

FIG. 2 shows an exploded side view of the timer with portions shown in cross section, FIG. 3 shows the cap and stirrup in a perspective view, and FIG. 4 is another perspective view similar to FIG. 1 but showing the timer inverted.

DETAILED DESCRIPTION OF THE INVENTION

The timer 10 is ovoid in shape and has two half shells 11 and 12. The half shell 11 has a window 13 through which an indicia 14 of the remaining time may be read. The timer is of conventional design in which the two shells may be rotated with respect to each other first in one direction to wind the spring of the clock mechanism and of the ringer and then rotated in the opposite direction to cause the desired time to appear in the window 13. In view of the conventional arrangement of the timer its further details are not shown or described here.

To enable the timer to be readily carried along preferably as a pendant when leaving the kitchen the timer has a cord 20 perferably of braided nylon of approximately 6 mm in diameter which material and size prevents it from becoming easily entagled with smaller objects. The cord 20 is of sufficient length to be slipped around the neck readily for wearing as a pendant.

FIG. 1 shows the retainer loop 32 of the stirrup 30 which is shown in its entirety in FIGS. 2 and 3 as comprising a central arm portion 36, the aforementioned loop 32 on one end and an eyelet 33 on the other end. The arm portion 36 of the stirrup 30 generally conforms to the rounded contour of the half shell 12.

The half shell 12 has a tapped opening or hole 15 for receipt of the screw 50 and an untapped hole 16 designed to receive the pin 44 of the cap 40. The cord is doubled over to form a loop and the two ends are passed through the loop 32 in the direction of the arrow 27 which loop 32 is dimensioned to frictionally engage the two strands 24 and 25 of the cord 20. The strands 24 and 25 are then positioned to lie along the arm 36 of the stirrup 30 such that the strands 24 and 25 lie within a notch 42 in the cap 40. The ends of the strands 24 and 25 come to rest within the cap 40 and the cap is applied to the adjacent half shell 12 by inserting the pin 44 in the opening 16 and then passing the screw 50 through the opening 45 in the cap 40, then through the eyelet 33 and into the tapped hole 15. The ends of the strands 24 and 25 extend slightly beyond the end of the eyelet 33 as indicated by the arrow 28. They are, however, as noted above, still enclosed within the confines of the cap 40. The relationship between the pin and the opening 16 is such as to prevent rotation of the cap 40 with respect to the half shell 12 when the screw 50 is applied. When the cap 40 has been secured by the screw 50 to the half shell 12 the arm 36 of the stirrup 30 and the strands 24 and 25 will extend through the notch 42 in cap 40 and the ends of the strands 24 and 25 will be gripped or clamped between the inner surface of the cap 40 and the adjacent surface of the half shell 12 thus the cap not only holds the strands and the other parts to the timer but also covers the ends of the strands and the eyelet 33 as shown in FIG. 4.

I claim:

1. A timer having a clock mechanism and a case housing, said timer also including a stirrup, said stirrup being shaped generally to conform to the outer shape of the housing adjacent thereto, one end of said stirrup having an eyelet, the other end of said stirrup having a loop, a cord, said cord being doubled to have two strands, the two strands of said cord passing frictionally through said loop and along said stirrup toward said eyelet and terminating adjacent said eyelet, a cap, a notch in the periphery of said cap, said strands and said stirrup extending through said notch, means for attaching said cap to an adjacent part of said case with said eyelet and the ends of said strands therebetween.

* * * * *